(12) United States Patent
Tsugawa et al.

(10) Patent No.: US 12,397,956 B2
(45) Date of Patent: Aug. 26, 2025

(54) PRODUCTION MANAGEMENT DEVICE, PRODUCTION MANAGEMENT SYSTEM, AND COMBINATION WEIGHING APPARATUS

(71) Applicant: Ishida Co., Ltd., Kyoto (JP)

(72) Inventors: Tono Tsugawa, Ritto (JP); Tatsuo Ito, Ritto (JP); Shinji Koike, Ritto (JP); Hideshi Miyamoto, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 0 days.

(21) Appl. No.: 18/182,858

(22) Filed: Mar. 13, 2023

(65) Prior Publication Data

US 2023/0294865 A1    Sep. 21, 2023

(30) Foreign Application Priority Data

Mar. 15, 2022    (JP) ................................ 2022-040206

(51) Int. Cl.
*B65B 57/14*    (2006.01)
*B65B 9/08*    (2012.01)
*B65B 61/02*    (2006.01)

(52) U.S. Cl.
CPC .............. *B65B 57/145* (2013.01); *B65B 9/08* (2013.01); *B65B 61/025* (2013.01)

(58) Field of Classification Search
CPC ........ B65B 57/145; B65B 9/08; B65B 61/025
See application file for complete search history.

(56) References Cited

U.S. PATENT DOCUMENTS

| | | | |
|---|---|---|---|
| 6,285,918 B1 | 9/2001 | Kono | |
| 7,752,826 B2 * | 7/2010 | Yamaguchi | ............... B65B 1/32 53/502 |

(Continued)

FOREIGN PATENT DOCUMENTS

| | | |
|---|---|---|
| CN | 108698716 A | 10/2018 |
| CN | 208931759 U | 6/2019 |

(Continued)

OTHER PUBLICATIONS

The partial European search report (R. 64 EPC) issued by the European Patent Office on Jul. 20, 2023, which corresponds to European Patent Application No. 23161702.8-1001 and is related to U.S. Appl. No. 18/182,858.

*Primary Examiner* — Joshua G Kotis
*Assistant Examiner* — Scott A Howell
(74) *Attorney, Agent, or Firm* — Studebaker Brackett PLLC (57) ABSTRACT

A production management device includes: a communication section provided to enable communication with a combination weighing apparatus and a bag-making and packaging apparatus; a management device provided to enable communication with the combination weighing apparatus and the bag-making and packaging apparatus via the communication section; and a storage device configured to store therein various information. The management device generates and stores production information in the storage device. In the production information, a weighing value of articles weighed by the combination weighing apparatus, the weighing value being output at discharge timing at which the combination weighing apparatus discharged the articles to the bag-making and packaging apparatus, is associated with identification information given to a packaging film of the articles, the identification information being output at pack- (Continued)

aging timing at which the articles discharged at the discharge timing were packaged by the bag-making and packaging apparatus.

8 Claims, 6 Drawing Sheets

(56) References Cited

U.S. PATENT DOCUMENTS

| | | | | |
|---|---|---|---|---|
| 2004/0043122 A1* | 3/2004 | Yakushigawa | ........... | A23P 20/15 366/279 |
| 2004/0231299 A1* | 11/2004 | Yakushigawa | ........... | A23L 27/00 53/550 |
| 2006/0231295 A1* | 10/2006 | Yamaguchi | ............ | G01G 15/00 177/25.18 |
| 2008/0302580 A1* | 12/2008 | Kawanishi | ........... | G01G 19/393 177/25.18 |
| 2009/0173046 A1* | 7/2009 | Nakagawa | ............... | B65B 41/18 53/450 |
| 2015/0274333 A1* | 10/2015 | Greyshock | .............. | G07F 9/001 414/800 |
| 2019/0071196 A1* | 3/2019 | Watanabe | ............. | B65B 51/067 |
| 2020/0371508 A1* | 11/2020 | Tarumoto | ................ | G06Q 50/12 |
| 2021/0284374 A1* | 9/2021 | Toedtli | .................... | B65B 35/40 |
| 2023/0053278 A1* | 2/2023 | Finch | ..................... | A61J 7/0084 |

FOREIGN PATENT DOCUMENTS

| | | |
|---|---|---|
| EP | 1 081 569 A2 | 3/2001 |
| JP | 2000-185721 A | 7/2000 |
| JP | 2004-028821 A | 1/2004 |
| JP | 2011-002353 A | 1/2011 |

* cited by examiner

| T1 | CALCULATION NUMBER | WEIGHING VALUE | TIME STAMP 1 | NUMBER OF HEADS |
|---|---|---|---|---|
| | W0001 | 50.5 | 2022-02-22 14:38:10 | 4 |
| | W0002 | 50.9 | 2022-02-22 14:38:11 | 4 |
| | ...... | ...... | ...... | ...... |

*Fig.5A*

| T2 | BAG SERIAL NUMBER | CALCULATION NUMBER | TIME STAMP 2 | WHETHER ARTICLES WERE BIT |
|---|---|---|---|---|
| | B1001 | W0001 | 2022-02-22 14:38:20 | 0 |
| | B1002 | W0002 | 2022-02-22 14:38:22 | 0 |
| | ...... | ...... | ...... | ...... |

| BAG SERIAL NUMBER | WEIGHT VALUE | TIME STAMP 3 |
|---|---|---|
| B1001 | 50.5 | 2022-02-22 14:40:00 |
| B1002 | 51.0 | 2022-02-22 14:40:02 |
| ... | ... | ... |

| BAG SERIAL NUMBER | BAG THICKNESS | TIME STAMP 4 |
|---|---|---|
| B1001 | 40.2 | 2022-02-22 14:40:10 |
| B1002 | 40.9 | 2022-02-22 14:40:12 |
| ... | ... | ... |

| WEIGHING NUMBER | BAG SERIAL NUMBER | TIME STAMP 1 | TIME STAMP 2 | WHETHER ARTICLES WERE BIT | TIME STAMP 3 | WEIGHT VALUE | TIME STAMP 4 | BAG THICKNESS |
|---|---|---|---|---|---|---|---|---|
| W0001 | B1001 | 2022-02-22 14:38:10 | 2022-02-22 14:38:20 | 0 | 2022-02-22 14:40:00 | 50.5 | 2022-02-22 14:40:10 | 40.2 |
| W0002 | B1002 | 2022-02-22 14:38:11 | 2022-02-22 14:38:22 | 0 | 2022-02-22 14:40:02 | 51.0 | 2022-02-22 14:40:12 | 40.9 |
| ... | ... | ... | ... | ... | ... | ... | ... | ... |

PRODUCTION MANAGEMENT DEVICE, PRODUCTION MANAGEMENT SYSTEM, AND COMBINATION WEIGHING APPARATUS

TECHNICAL FIELD

One aspect of the present disclosure relates to a production management device, a production management system, and a combination weighing apparatus.

BACKGROUND

As a production line for confectioneries and the like, a series of production lines has been known that include a combination weighing apparatus configured to separate and weigh objects to be weighed that individually vary in weight so as to achieve a target weight, and a packaging apparatus configured to produce bags from film and put the objects separated and weighed by the combination weighing apparatus in the produced bags. Patent Document 1 (Japanese Unexamined Patent Publication No. 2004-28821) discloses a recording device configured to give a barcode to a bag containing merchandise produced in this way and store, in a storage memory, inspection results (X-ray images) of the merchandise with the barcode given.

On such production lines, in addition to the X-ray inspection described above, a sampling inspection is performed manually, in which an object to be weighed contained in a bag is taken out, the object to be weighed is weighed by static weighing, and compared with data displayed by the combination weighing apparatus. Then, based on results of such sampling inspections, verification (adjustment) of the combination weighing apparatus is performed.

SUMMARY

There is a need to efficiently verify (adjust) the combination weighing apparatus without manual inspection work by keeping records of such sampling inspections as in the conventional recording device described above. However, the above inspection results require management of information on the upstream process of the packaging apparatus, and cannot be handled by the above conventional recording device that manages inspection results of the process downstream from the packaging apparatus.

Therefore, it is an object of one aspect of the present disclosure to provide a production management device, a production management system, a combination weighing apparatus, and a packaging apparatus that are capable of reducing man-hours needed for sampling inspections in a production line including the combination weighing apparatus and the packaging apparatus.

A production management device according to one aspect of the present disclosure includes: a communication section provided to enable communication with a combination weighing device and a packaging apparatus, the combination weighing apparatus being configured to perform combination calculation of articles and the packaging apparatus being configured to package the articles discharged from the combination weighing apparatus with a packaging material; a management section provided to enable communication with the combination weighing apparatus and the packaging apparatus via the communication section; and a storage section configured to store therein various information. The management section generates production information associating a weighing value of the articles weighed by the combination weighing apparatus with identification information given to the packaging material of the articles, the weighing value being output at a discharge timing at which the combination weighing apparatus discharged the articles to the packaging apparatus and the identification information being output at a packaging timing at which the articles discharged at the discharge timing were packaged by the packaging apparatus, and the management section stores the production information in the storage section.

In the production management system having this configuration, by reading the identification information given to the packaging material with which the articles are packaged, the weighing value of the packaged articles can be obtained based on the production information stored in the storage device. This saves time and effort in removing the packaged articles from their packaging, and in weighing the articles. As a result, the man-hours needed for sampling inspections can be reduced in a production line including the combination weighing apparatus and the packaging apparatus.

In a production management device according to one aspect of the present disclosure, the management section may receive weighing information from the combination weighing apparatus and receives packaging information from the packaging apparatus, the weighing information associating the weighing value with a calculation number associated with the combination calculation and the packaging information associating the calculation number with the identification information output at the packaging timing, and generates the production information based on the weighing information and the packaging information. In the production management device having this configuration, the weighing value of the articles can be associated with the identification information given to the packaging material, using the calculation number as a key.

In a production management device according to one aspect of the present disclosure, the weighing information may include information about the combination weighing apparatus when the combination weighing was performed as information to be associated with the calculation number in addition to the weighing value. In the production management device having this configuration, instead of simply associating a weighing value with identification information, information about the combination weighing apparatus when other combination weighing was performed can be associated with the calculation number and stored therein. As a result, not only the weighing value of each packaged merchandise can be grasped, but also the state of the combination weighing apparatus when the articles for the merchandise, identified by the identification information, were weighed in combination can be grasped after the fact.

In a production management device according to one aspect of the present disclosure, the packaging information may include information about the packaging apparatus when the articles were packaged as information to be associated with the calculation number in addition to the identification information. In the production management device having this configuration, instead of simply associating a weighing value with identification information, information about the packaging apparatus when other articles were packaged with the calculation number. As a result, not only the weighing value for each packaged merchandise can be grasped, but also the state of the packaging apparatus when the articles were packaged can also be grasped after the fact.

A production management system according to one aspect of the present disclosure includes: combination weighing apparatus configured to perform combination calculation of articles; a packaging apparatus provided to enable communication with the communication section, and configured to package articles discharged from the combination weighing apparatus with a packaging material; a management device provided to enable communication with the combination weighing apparatus and the packaging apparatus; and a storage device configured to store therein various information. The management device generates production information associating a weighing value of the articles weighed by the combination weighing apparatus with identification information given to the packaging material of the articles, the weighing value being output at a discharge timing at which the combination weighing apparatus discharged the articles to the packaging apparatus and the identification information being output at a packaging timing at which the articles corresponding to the weighing value were packaged by the packaging apparatus, and the management section stores the production information in the storage section.

In the production management system having this configuration, by reading the identification information given to the packaging material in which the articles are packaged, the weighing value of the packaged articles can be obtained based on the production information stored in the storage device. This saves time and effort in removing the packaged articles from their packaging, and in weighing the articles. As a result, the man-hours needed for sampling inspections can be reduced in a production line including the combination weighing apparatus and the packaging apparatus.

In a production management system according to one aspect of the present disclosure, the combination weighing apparatus may output a calculation number generated every time the combination calculation is performed to the packaging apparatus at the discharge timing, and outputs weighing information associating the weighing value with the calculation number to the management device. The packaging apparatus may receive the calculation number output from the combination weighing apparatus and outputs packaging information associating the received calculation number with the identification information output to the management device at the packaging timing. The management device may generate the production information based on the weighing information received from the combination weighing apparatus and the packaging information received from the packaging apparatus. In the production management system having this configuration, the weighing value of the articles can be associated with the identification information given to the packaging material, using the calculation number as a key.

In a production management system according to one aspect of the present disclosure, the weighing information may include information about the combination weighing apparatus when the combination calculation was performed as information to be associated with the calculation number in addition to the weighing value. In the production management system having this configuration, instead of simply associating a weighing value with identification information, other information can be associated with the calculation number and stored therein. As a result, not only the weighing value of each packaged merchandise can be grasped, but also the state of the combination weighing apparatus when the articles for the merchandise, identified by the identification information, were weighed in combination can be grasped after the fact.

In a production management system according to one aspect of the present disclosure, the packaging information may include information about the packaging apparatus when the articles were packaged as information to be associated with the calculation number in addition to the identification information. In the production management system having this configuration, instead of simply associating a weighing value with identification information, other information can be associated with the calculation number and stored therein. As a result, not only the weighing value for each packaged merchandise can be grasped, but also the state of the packaging apparatus when the articles were packaged can also be grasped after the fact.

In a combination weighing apparatus of a production management system according to one aspect of the present disclosure, a timing for sending the weighing information to the management device and a timing for sending the calculation number to the packaging apparatus may differ from each other in the combination weighing apparatus. In the production management system having this configuration, the communication or processing load can be reduced by changing their sending timing. In other words, the timing for transmission to the packaging apparatus, which is needed immediately during production, can be set before the timing for transmission to the management device. By using different transmission timing in this manner, the communication or processing load can be reduced.

A combination weighing apparatus according to one aspect of the present disclosure is a combination weighing apparatus configured to perform combination calculation of articles. The combination weighing apparatus includes: a communication section provided to enable communication with a packaging apparatus and a management device, the packaging apparatus being configured to package articles discharged from the combination weighing apparatus with a packaging material and the management device being configured to manage the combination weighing apparatus; and a control section configured to output a calculation number generated every time the combination calculation is performed to the packaging apparatus at a discharge timing at which the articles are discharged to the packaging apparatus, and configured to output weighing information associating a weighing value related to the articles weighed by the combination calculation with the calculation number to the management device.

In the combination weighing apparatus having this configuration, information needed to generate production information can be output to the management device. In the production information, a weighing value related to the articles weighed by the combination weighing apparatus, the weighing value being output at discharge timing at which the combination weighing apparatus discharged the articles to the packaging apparatus, is associated with identification information given to the packaging material of the articles, the identification information being output at packaging timing at which the articles corresponding to the weighing value were packaged by the packaging apparatus. This saves time and effort in removing the packaged articles from their packaging, and in weighing the articles. As a result, the man-hours needed for sampling inspections can be reduced in a production line including the combination weighing apparatus and the packaging apparatus.

In a control section of a combination weighing apparatus according to one aspect of the present disclosure, a timing for sending the weighing information to the management device and a timing for sending the calculation number to the packaging apparatus may differ from each other in the control section. In the combination weighing apparatus having this configuration, the communication load can be reduced by changing their sending timing. In other words, the timing for transmission to the packaging apparatus, which is needed immediately during production, can be set before the timing for transmission to the management device. By using different transmission timing in this manner, the communication or processing load can be reduced.

A packaging apparatus according to one aspect of the present disclosure is a packaging apparatus configured to package articles discharged from a combination weighing apparatus with a packaging material, the combination weighing apparatus being configured to perform combination calculation of articles. The packaging apparatus includes: a communication section provided to enable communication with the combination weighing apparatus and a management device configured to manage the packaging apparatus; and a control section configured to receive a calculation number generated every time the combination calculation is performed at a discharge timing at which the articles are discharged from the combination weighing apparatus, and configured to output packaging information associating the calculation number with identification information given to the packaging material of the articles to the management device, the identification information being output at a packaging timing for packaging the articles discharged from the combination weighing apparatus.

In the packaging apparatus having this configuration, information needed to generate production information can be output to the management device. In the production information, a weighing value related to the articles weighed by the combination weighing apparatus, the weighing value being output at discharge timing at which the combination weighing apparatus discharged the articles to the packaging apparatus, is associated with identification information given to the packaging material of the articles, the identification information being output at packaging timing at which the articles corresponding to the weighing value were packaged by the packaging apparatus. This saves time and effort in removing the packaged articles from their packaging, and in weighing the articles. As a result, the man-hours needed for sampling inspections can be reduced in a production line including the combination weighing apparatus and the packaging apparatus.

According to one aspect of the present disclosure, man-hours needed for sampling inspections can be reduced in a production line including the combination weighing apparatus and the packaging apparatus.

DETAILED DESCRIPTION

A production management system 100 according to one embodiment will be described below with reference to the drawings. In the description of the drawings, identical components will be marked with the same reference signs and redundant explanations will be omitted.

Figure 1:
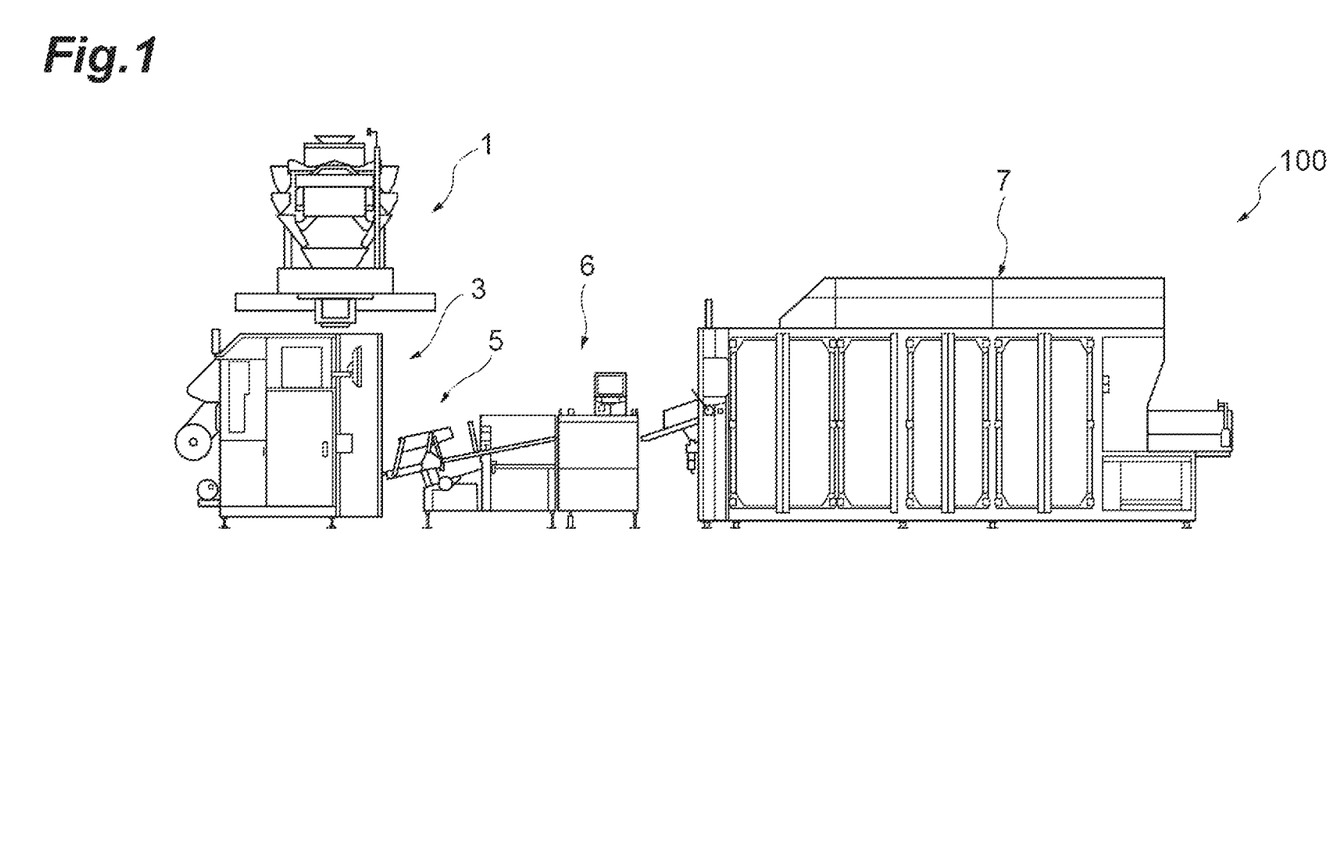
FIG. 1 is a schematic configuration of a production line managed by a production management system according to one embodiment.
Figure 4:
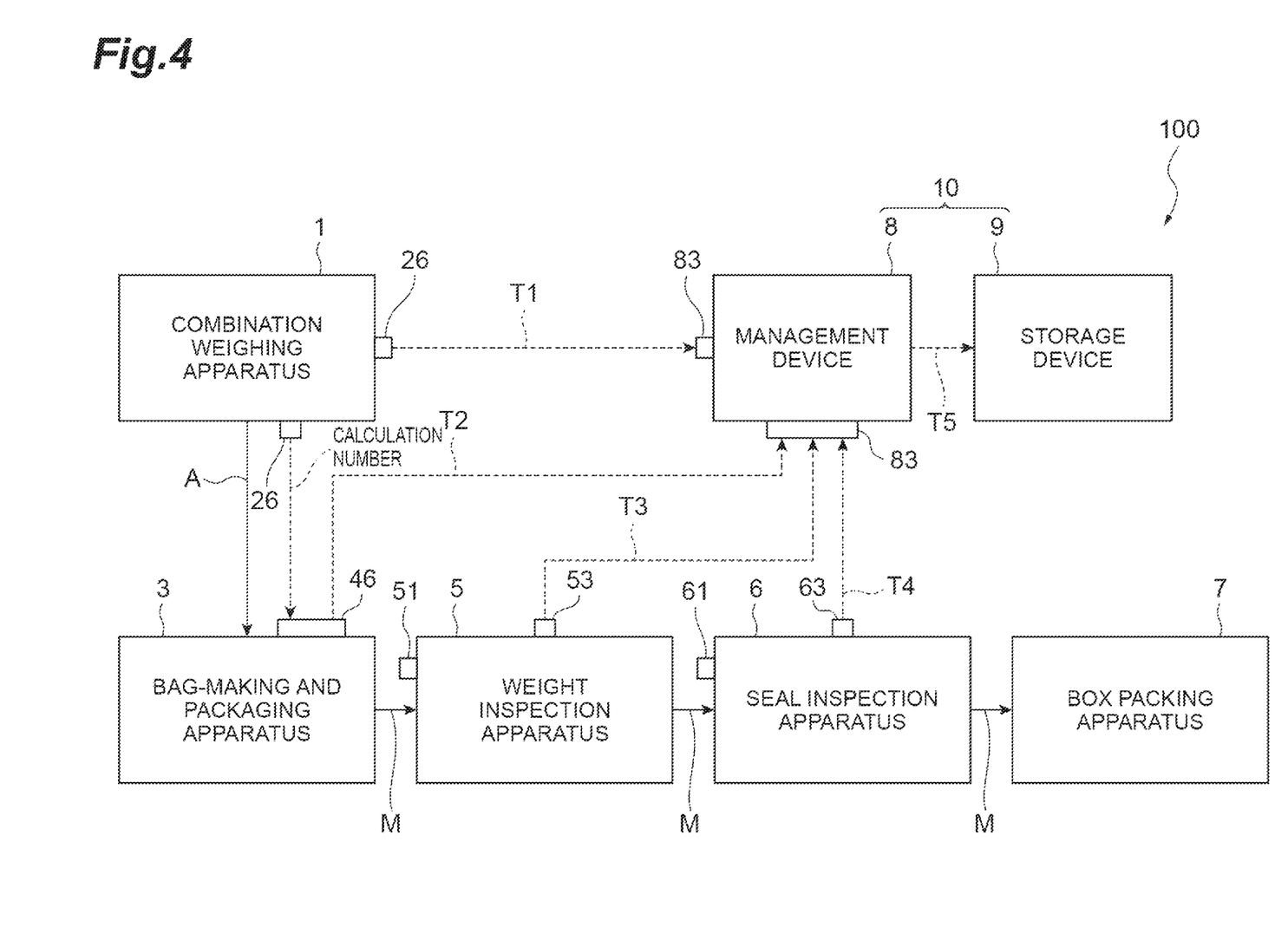
FIG. 4 is a block diagram illustrating a functional configuration of the production management system.

As illustrated in FIG. 1, the production management system 100 includes at least a combination weighing apparatus 1, a bag-making and packaging apparatus (packaging apparatus) 3, and a production management device 10 (refer to FIG. 4). In addition to these components, the production management system 100 includes a weight inspection apparatus 5, a seal inspection apparatus 6, and a box packing apparatus 7. A group of devices made up of the combination weighing apparatus 1, the bag-making and packaging apparatus 3, the weight inspection apparatus 5, the seal inspection apparatus 6, and the box packing apparatus 7 constitute a production line that performs from weighing and packaging of an article A to inspection and boxing of merchandise M. The article A is an article that varies in unit mass, for example, snacks, agricultural products, marine products, and processed foods.

Figure 2:
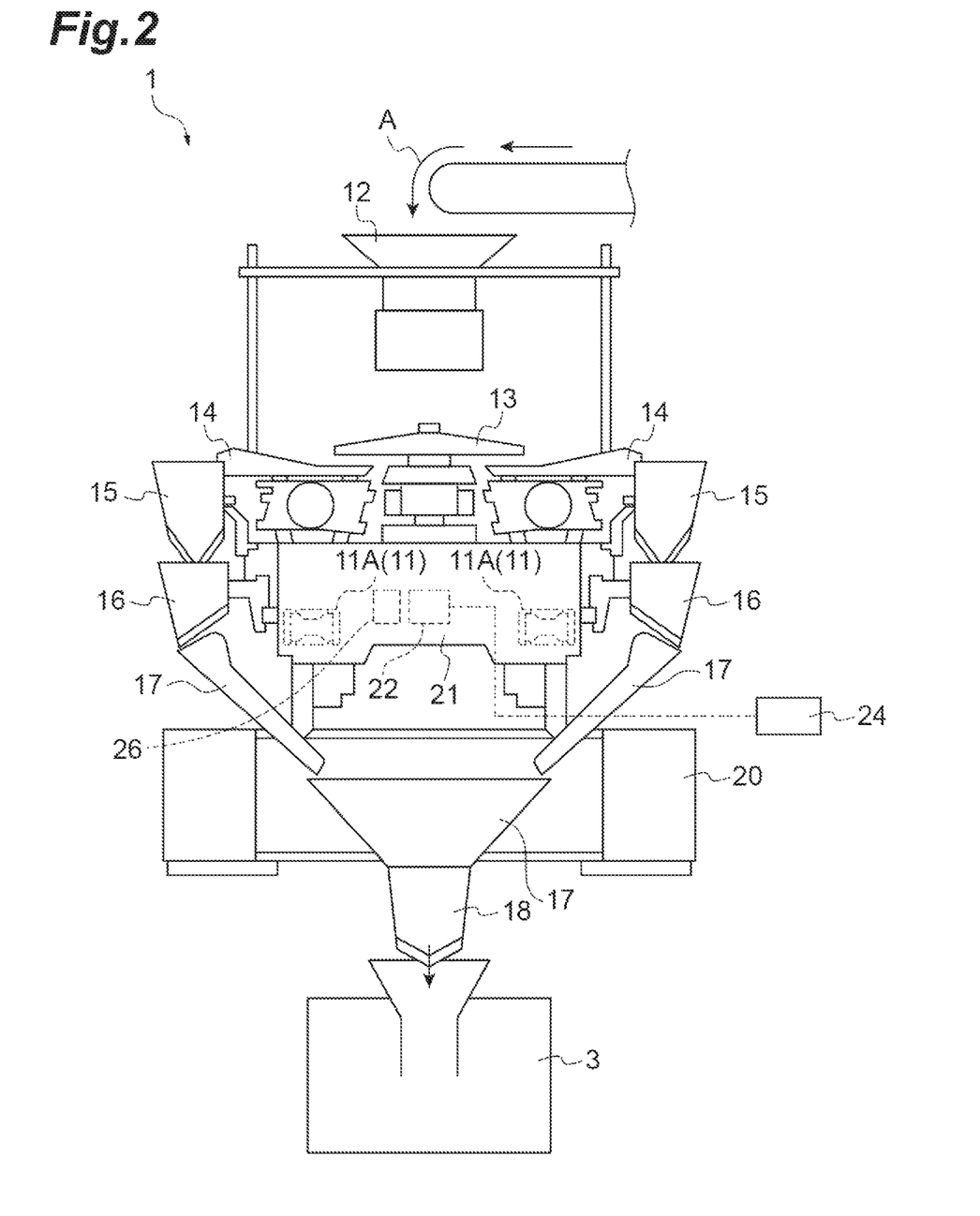
FIG. 2 is a diagram illustrating a schematic configuration of a combination weighing apparatus.

The combination weighing apparatus 1 is a device configured to perform combination calculation of articles A. As illustrated in FIG. 2, the combination weighing apparatus 1 includes a feeding chute 12, a distributing feeder 13, a plurality of radial feeders 14, a plurality of pool hoppers 15, a plurality of weighing hoppers 16, collective chutes 17, a timing hopper 18, a weighing sections 11, a display operation section 24, a communication section 26, and a control section 22. The combination weighing apparatus 1 feeds the articles A to the weighing hoppers 16 for weighing, determines combinations of the weighing hoppers 16 in accordance with the obtained weighing values of the respective articles in the weighing hoppers 16, selects, from the determined combinations, a combination of the articles A close to the target weight value, and repeats a cycle of discharging the articles from the weighing hoppers 16 pertaining to the selected combination.

The weighing section 11 is located inside a case 21 supported by a frame 20. The weighing section 11 has a plurality of load cells 11A. Each load cell 11A supports a corresponding weighing hopper 16. The weighing section 11 weighs (obtains) the weight value of each weighing hopper (the weighing value corresponding to the mass of the article A) when the article A is temporarily stored in each weighing hopper 16. In the present embodiment, the weighing section 11 obtains time-series weighing values by real-time weighing (sequential weighing) in at least one of the weighing hoppers 16.

The communication section 26 is an interface enabling communication with other devices. The communication section 26 is provided to enable communication with the bag-making and packaging apparatus 3 and a management device 8. Communication with the bag-making and packaging apparatus 3 and the management device 8 may be wired or wireless.

The control section (control section) 22 is located inside the case 21. The control section 22 has a central processing unit (CPU), read only memory (ROM), random access memory (RAM), and the like. The control section 22 controls the parts constituting the combination weighing apparatus 1. As illustrated in FIG. 4, the control section 22 is communicatively connected to both the bag-making and packaging apparatus 3 and the management device 8 via the communication section 26.

The control section 22 stores therein the weighing value weighed by the weighing section 11 and the weighing hopper 16 configured to store therein the article A corresponding to that weighing value in association with each other. The control section 22 selects a combination of the articles A from a plurality of weighing values of the respective articles A that have been weighed by the weighing section 11 and associated with the respective weighing hopper 16 so that the total value becomes the target weight value. More specifically, the control section 22 combines the weighing values of the respective articles A output by the respective weighing sections 11, and selects a combination (performs a combination calculation) of the articles A so that the total combination value is close to the target weight value and within a predetermined range. The control section 22 then discharges the articles A from the weighing hoppers 16 pertaining to the calculated combination of the articles A.

Figure 5A:
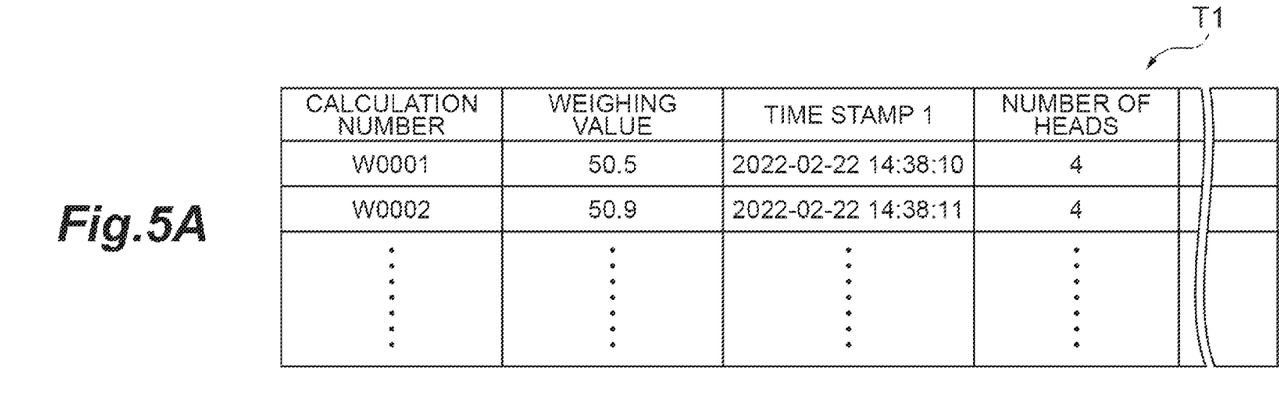
FIG. 5A is a diagram illustrating an example of weighing information.

The control section 22 issues (generates) a calculation number every time the combination calculation is performed. More precisely, as illustrated in FIG. 5A, the control section 22 generates weighing information T1 in which at least a weighing value is associated with a calculation number generated every time the combination calculation is performed. The weighing value is a value close to the target weight value the combination calculation of which is performed by the weighing values of the load cells 11A corresponding to the weighing hoppers 16. The weighing information T1 of the present embodiment includes, in addition to the weighing value, information about the combination weighing apparatus when the combination calculation was performed, as information to be associated with calculation number. Examples of this information about the combination weighing apparatus include a time stamp 1 that is time information when the combination calculation was performed, the number of heads that is the number of weighing hoppers 16 used in the above combination calculation, and hopper identification information that identifies the weighing hoppers 16 used in the above combination calculation.

As illustrated in FIG. 4, the control section 22 outputs a calculation number generated every time the combination calculation is performed, at discharge timing for discharging the articles A to the bag-making and packaging apparatus 3. The articles A discharged from the selected weighing hoppers 16 when the combination calculation is performed are simultaneously discharged from the timing hopper 18 by the interlocking mechanism. The control section 22 controls the interlocking mechanism described above and also monitors the timing for discharging, from timing hopper 18, the articles A discharged from the weighing hoppers 16, which were selected when the combination calculation was performed. This allows the control section 22 to output the calculation number to the bag-making and packaging apparatus 3 at the discharge timing for discharging the articles A.

The control section 22 outputs the above weighing information T1 to the management device 8 via the communication section 26. The timing at which the control section 22 outputs the above weighing information T1 to the management device 8 differs from the timing at which the calculation number is sent to the bag-making and packaging apparatus 3. In other words, in the control section 22, the timing at which the calculation number is sent to the bag-making and packaging apparatus 3 and the timing at which the weighing information T1 is sent to the management device 8 differ from each other. For example, the control section 22 transmits a weighing number to the bag-making and packaging apparatus 3 prior to the timing for transmitting the weighing information T1 to the management device 8. In this way, the communication or processing load in the control section 22 and the communication section 26 can be reduced while information needed for production is transmitted in real time.

Figure 3:
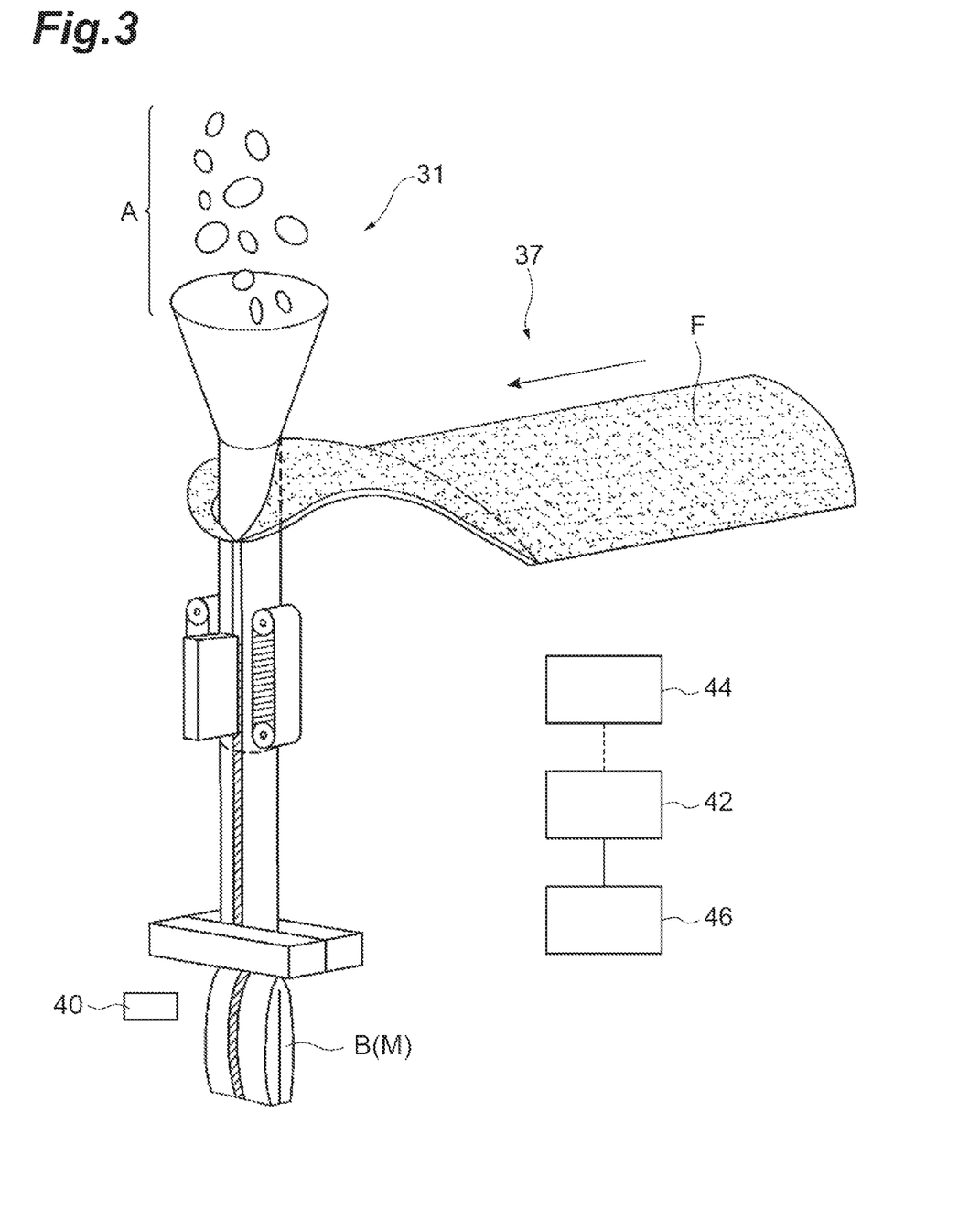
FIG. 3 is a diagram illustrating a schematic configuration of a bag-making and packaging apparatus.

The bag-making and packaging apparatus 3 illustrated in FIG. 1 is a device configured to produce the merchandise M by packaging the articles A the combination calculation of which was performed by the combination weighing apparatus 1 while making bags for packaging the articles A. As illustrated in FIG. 3, the bag-making and packaging apparatus 3 packs the articles A fed from the combination weighing apparatus 1 into a bag. The bag-making and packaging apparatus 3 includes a bag-making and packaging unit 31, a film supply unit 37, a printing section 40, a display operation section 44, and a control section 42.

The printing section 40 prints (gives) a bag serial number (identification information) that identifies a bag B on a packaging film (packaging material) F that forms the bag B. The bag serial number is, for example, a number that uniquely distinguishes the bags B produced in a given period of time. The bag serial number printed by the printing section 40 is obtained by the control section 42.

A communication section 46 is an interface enabling communication with other devices. The communication section 46 is provided to enable communication with the combination weighing apparatus 1 and the management device 8. Communication with the combination weighing apparatus 1 and the management device 8 may be wired or wireless.

The control section 42 is located inside a main section (not illustrated) of the bag-making and packaging apparatus 3. The control section 42 has a CPU, ROM, RAM, and the like. The control section 42 controls the parts constituting the bag-making and packaging apparatus 3. The control section 42 is communicatively connected to both the combination weighing apparatus 1 and the management device 8 via the communication section 46.

The control section 42 gives, to the packaging film F (i.e., the bag B) of the articles A, a bag serial number (identification information), which is output at the packaging timing for packaging the articles A discharged from the combination weighing apparatus 1. More specifically, the control section 42 issues (generates) a bag serial number for each bag B formed, and controls the printing section 40 to print the issued bag serial number on the bag B in which the articles A discharged from the combination weighing apparatus 1 are packaged.

Figure 5B:
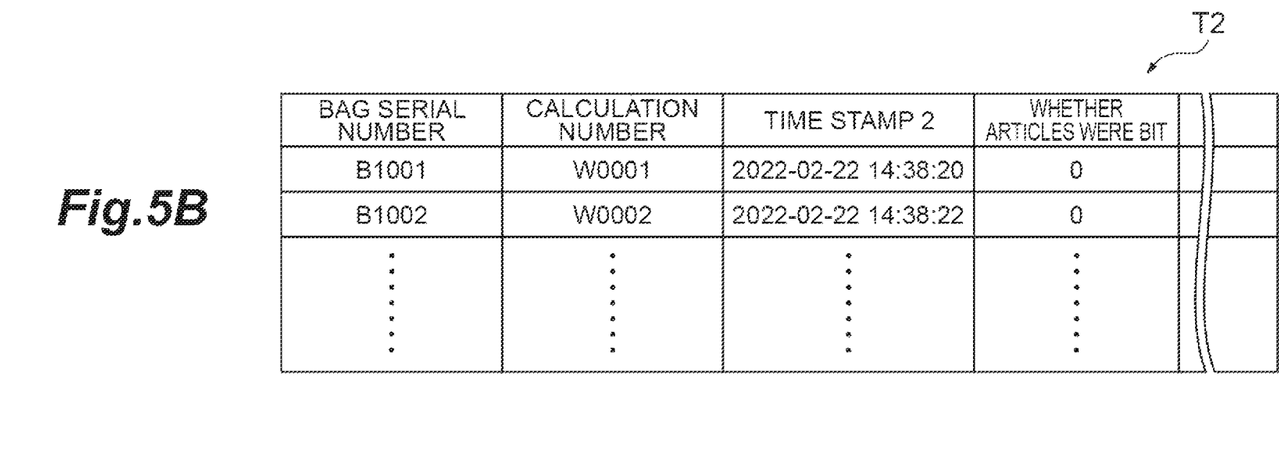
FIG. 5B is a diagram illustrating an example of packaging information.

The control section 42 receives the calculation number generated every time the combination calculation is performed, via the communication section 46 at the discharge timing for discharging the articles A from the combination weighing apparatus 1. As illustrated in FIG. 5B, the control section 42 generates packaging information T2 in which a calculation number is associated with a bag serial number given to the packaging film F of the articles A, the bag serial number being output at the packaging timing for packaging the articles A discharged from the combination weighing apparatus 1. As illustrated in FIG. 4, the control section 42 outputs the packaging information T2 to the management device 8 via the communication section 46.

The packaging information T2 of the present embodiment includes, in addition to the bag serial number, information about the bag-making and packaging apparatus 3 when the articles A discharged from the combination weighing apparatus were packaged, as information to be associated with calculation number. Examples of this information about the bag-making and packaging apparatus 3 include a time stamp 2 that is time information when the bag-making and packaging apparatus 3 was implemented, and information such as whether or not the above articles A were bit when packaged.

Figure 6A:
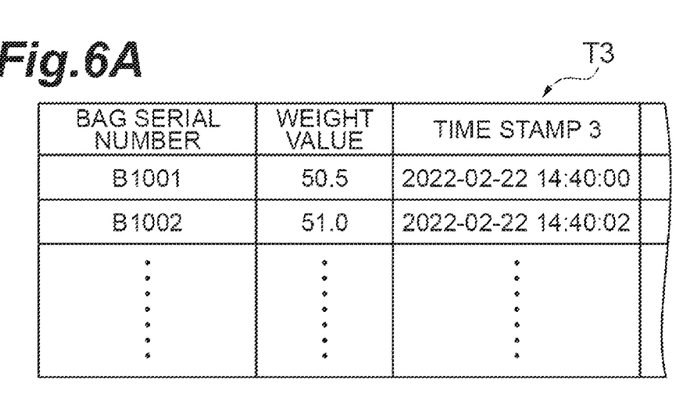
FIG. 6A is a diagram illustrating an example of weight inspection information.

The weight inspection apparatus 5 is a device configured to inspect the weight of the merchandise M produced in the bag-making and packaging apparatus 3. As illustrated in FIG. 6A, the weight inspection apparatus 5 generates weight inspection information T3 in which a bag serial number read by a camera 51, a weight value inspected by the weight inspection apparatus 5, and an inspection time (time stamp 3) are associated with each other. As illustrated in FIG. 4, a control section outputs the weight inspection information T3 to the management device 8 via a communication section 53.

Figure 6B:
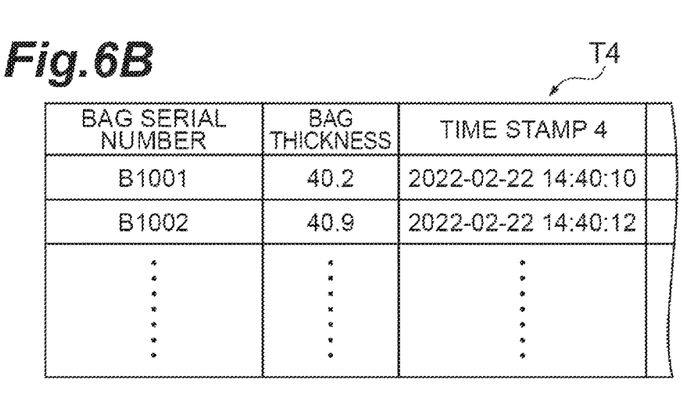
FIG. 6B is a diagram illustrating an example of bag thickness inspection information.

The seal inspection apparatus 6 is a device configured to inspect the thickness of the bag for the merchandise M and the bag for air leakage. As illustrated in FIG. 6B, the seal inspection apparatus 6 generates bag thickness inspection information T4 in which a bag serial number read by a camera 61, a bag thickness inspected by the seal inspection apparatus 6, and an inspection time (time stamp 4) are associated with each other. As illustrated in FIG. 4, the control section outputs the bag thickness inspection information T4 to the management device 8 via a communication section 63. The box packing apparatus 7 is a device configured to pack the merchandise M into cardboard boxes. The box packing apparatus 7 packs a plurality of pieces of the merchandise M into cardboard boxes, and transports the boxes to downstream processes.

As illustrated in FIG. 4, the production management device 10 includes a communication section 83, the management device (management section) 8, and a storage device (storage section) 9. The communication section 83 is an interface enabling communication with other devices. The communication section 83 is provided to enable communication with the combination weighing apparatus 1, the bag-making and packaging apparatus 3, the weight inspection apparatus 5, the seal inspection apparatus 6, and the box packing apparatus 7. Communication with other devices may be wired or wireless.

Figure 6C:
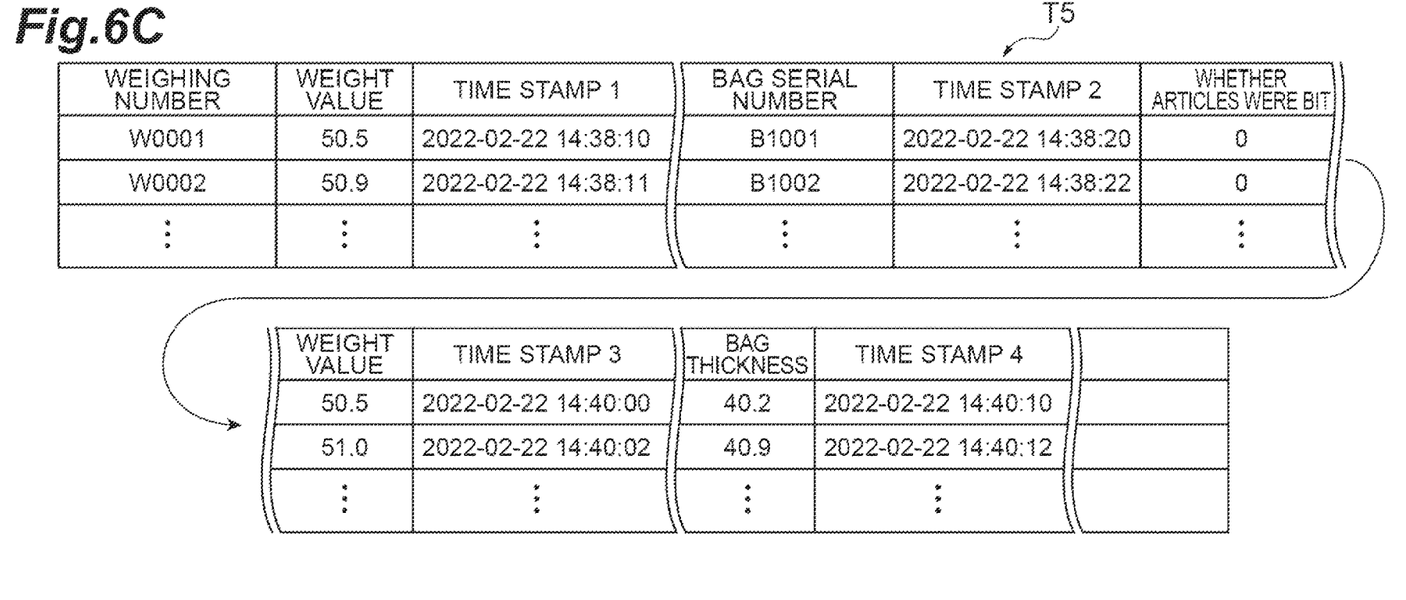
FIG. 6C is a diagram illustrating an example of production information.

The management device 8 is a device configured to integrally manages the combination weighing apparatus 1, the bag-making and packaging apparatus 3, the weight inspection apparatus 5, the seal inspection apparatus 6, the box packing apparatus 7, and the storage device 9. The management device 8 is a computer device having a CPU, ROM, RAM, and the like. The management device 8 generates and stores, in the storage device 9, production information T5 illustrated in FIG. 6C. In the production information T5, a weighing value of the total value of the articles A weighed by the combination weighing apparatus 1, which is output at the discharge timing at which the combination weighing apparatus 1 discharged the articles A to the bag-making and packaging apparatus 3, is associated with a bag serial number given to the packaging film F of the articles A, which is output at the packaging timing at which the articles A discharged at the discharge timing were packaged by the bag-making and packaging apparatus 3.

As illustrated in FIG. 4, in the present embodiment, the management device 8 receives, from the combination weighing apparatus 1, the weighing information T1 illustrated in FIG. 5A in which a weighing value is associated with a calculation number associated with the combination calculation. The management device 8 also receives, from the bag-making and packaging apparatus 3, the packaging information T2 illustrated in FIG. 5B in which a calculation number is associated with an identification information output at the packaging timing. The management device 8 then combines the weighing information T1 received from the combination weighing apparatus 1 and the packaging information T2 received from the bag-making and packaging apparatus 3, using the calculation number as a key, to generate production information T5.

The storage device 9 is a device configured to store therein the production information (detailed later) T5 generated by the management device 8. The storage device 9 is a device such as a hard disk drive or solid state drive. The storage device 9 stores therein the production information T5 generated by the management device 8.

The effects of the production management system 100 of the above embodiment will be described. In the production management system 100 of the above embodiment, by reading the bag serial number printed on the packaging film F in which the articles A are packaged, the weighing value of the packaged articles A can be obtained based on the production information T5 stored in the storage device 9. This saves time and effort in removing the packaged articles A from their packaging, and in weighing the articles A. As a result, the man-hours needed for sampling inspections can be reduced in a production line including the combination weighing apparatus 1 and the bag-making and packaging apparatus 3.

In the production management system 100 of the above embodiment, the combination weighing apparatus 1 outputs, to the bag-making and packaging apparatus 3, a calculation number generated every time the combination calculation is performed, at the discharge timing, and also outputs, to the management device 8, the weighing information T1 in which a weighing value is associated with the calculation number. The bag-making and packaging apparatus 3 receives the calculation number output from the combination weighing apparatus 1, and also outputs, to the management device 8, the packaging information T2 in which the received calculation number is associated with a bag serial number output at the packaging timing. The management device 8 generates the production information T5 on the basis of the weighing information T1 received from the combination weighing apparatus 1 and the packaging information T2 received from the bag-making and packaging apparatus 3. This makes it possible to associate the weighing value of the articles A with the bag serial number given to the packaging film F, using the calculation number as a key.

In the production management system 100 of the above embodiment, instead of simply associating a weighing value with a bag serial number, information such as the number of heads, hopper identification information, and a time stamp that is time information when the combination calculation was performed can be associated with the calculation number and stored therein. This makes it possible not only to grasp the weighing value for each packaged merchandise, but also to grasp after the fact the state of the combination weighing apparatus 1 when the articles A, for the merchandise M identified by the bag serial number, were weighed in combination.

In the production management system 100 of the above embodiment, instead of simply associating a weighing value with a bag serial number, information such as a time stamp that is time information when the bag-making and packaging apparatus 3 was implemented, and whether or not the above articles A were bit when packaged can be associated with the calculation number and stored therein. This makes it possible not only to grasp the weighing value for each packaged merchandise M, but also to grasp after the fact the state of the bag-making and packaging apparatus 3 when the articles A were packaged.

In the combination weighing apparatus 1 of the production management system 100 of the above embodiment, the timing at which the weighing information T1 is sent to the management device 8 and the timing at which the calculation number is sent to the bag-making and packaging apparatus 3 are made different from each other, so that the communication load can be reduced by changing their sending timing.

Although one embodiment has been described above, one aspect of the present disclosure is not limited to the above embodiment. Various changes are possible without departing from the intent of the disclosure.

In the above embodiment, the calculation number issued by the combination weighing apparatus 1 has been described with an example of using a combination of numerals and alphabetic characters. However, numbers alone, alphabetic characters alone, or a combination of these with symbols, for example, may be used as long as they are distinguishable from other weighing times. The same is true for the bag serial number issued by the bag-making and packaging apparatus 3.

The above embodiment and modifications have been described with an example in which a bag serial number is printed on a bag produced by the bag-making and packaging apparatus 3, but are not limited thereto. For example, an IC tag with a bag serial number stored therein may be attached, or a code (one-dimensional code, two-dimensional code, design, color, pattern, or hue) that can be uniquely converted to a bag serial number may be used.

The above embodiment and modifications have been described with an example in which the bag-making and packaging apparatus 3 encapsulates the articles A into the bag B and prints a bag serial number on the encapsulated bag B. However, a bag serial number may be given in advance to the packaging film F and the bag serial number may be generated (obtained) by reading the bag serial number printed on the encapsulated bag B with a camera or the like, for example.

The above embodiment and modifications have been described with an example in which the combination weighing apparatus 1 transmits a calculation number to the bag-making and packaging apparatus 3. However, the combination weighing apparatus 1 may transmit a weighing value to the bag-making and packaging apparatus 3, the bag-making and packaging apparatus 3 may generate and transmit, to the management device 8, packaging information in which the weighing value is associated with a bag serial number, and the management device 8 may store the packaging information received from the bag-making and packaging apparatus 3 in the storage device 9.

The above embodiment and modifications have been described with an example in which a group of devices including the combination weighing apparatus 1, the bag-making and packaging apparatus 3, the weight inspection apparatus 5, the seal inspection apparatus 6, and the box packing apparatus 7 constitute a production line. However, if the combination weighing apparatus 1 and the bag-making and packaging apparatus 3 are included, the weight inspection apparatus 5, the seal inspection apparatus 6, and the box packing apparatus 7 need not all be included, only some of the devices may be included, or other devices may be included. Regardless of the devices constituting the production line, the management device 8 may store, in the storage device 9, packaging information in which at least a weighing value is associated with a bag serial number of the bag B in which the articles A corresponding to the weighing value are packaged.

The above embodiment and modifications have been described with an example in which a device configured to, while producing the bag B, put the articles A in the bag B produced is applied, as an example of a packaging apparatus. However, a device configured to put the articles A in the bag B produced in advance may also be applied.

In addition to the functions of the management device 8 in the above embodiment and modifications, a combination weighing (hereinafter referred to as check weighing) may be provided to check whether the weighing value of the articles A contained in the bag B, which is identified by the bag serial number obtained as the production information T5, matches the weighing value obtained by the production information T5. Specifically, the management device 8 controls the control section 22 of the combination weighing apparatus 1 to weigh more weight values (e.g., 5% more) than the target weight value set in the combination weighing apparatus 1, at predetermined timing.

The predetermined timing includes, for example, a pattern in which one time of check weighing is performed every few times of normal weighing, and a pattern in which one time normal weighing→one time of check weighing→of two times of normal weighing→one time of check weighing-→three times of normal weighing→one time of check weighing are performed. In the production information T5, the management device 8 may check whether the weighing value of the articles A contained in the bag B, which is identified by the bag serial number obtained as the production information T5, matches the weighing value obtained by the production information T5, on the basis of whether the weighing number when the check weighing is performed, the weighing value, and the weight value inspected by the weight inspection apparatus 5 substantially match, and whether the pattern of occurrence of the weighing value at the time of check weighing matches the above predetermined timing.

What is claimed is:

1. A production management device comprising:
   a communication section provided to enable communication with a combination weighing apparatus and a packaging apparatus, the combination weighing apparatus being configured to perform combination calculation of articles and the packaging apparatus being configured to package the articles discharged from the combination weighing apparatus with a packaging material;
   a management section provided to enable communication with the combination weighing apparatus and the packaging apparatus via the communication section; and
   a storage section configured to store therein various information,
   wherein the management section generates production information associating a weighing value of the articles weighed by the combination weighing apparatus with identification information given to the packaging material of the articles, the weighing value being output at a discharge timing at which the combination weighing apparatus discharged the articles to the packaging apparatus and the identification information being output at a packaging timing at which the articles discharged at the discharge timing were packaged by the packaging apparatus, and the management section stores the production information in the storage section,
   wherein the identification information includes a unique identification number for each package that is packaged by the packaging apparatus, wherein the management section receives weighing information from the combination weighing apparatus and receives packaging information from the packaging apparatus, the weighing information associating the weighing value and information for identifying a number of heads of weighing hoppers used in the combination calculation, information for identifying the weighing hoppers used in the combination weighing with a calculation number associated with the combination calculation and the packaging information associating the calculation number with the identification information output at the packaging timing, and generates the production information based on the weighing information and the packaging information.

2. The production management device according to claim 1, wherein the packaging information includes information about the packaging apparatus when the articles were packaged as information to be associated with the calculation number in addition to the identification information.

3. The production management device according to claim 1, wherein the information about the combination weighing apparatus includes the identification of the number of weighing hoppers used in the combination calculation and the identification of which weighing hoppers were used in the combination calculation.

4. A production management system comprising:
a combination weighing apparatus configured to perform combination calculation of articles;
a packaging apparatus provided to communicate with a communication section, and configured to package articles discharged from the combination weighing apparatus with a packaging material;
a management device provided to communicate with the combination weighing apparatus and the packaging apparatus; and
a storage device configured to store therein various information,
wherein the management device generates production information associating a weighing value of the articles weighed by the combination weighing apparatus with identification information given to the packaging material of the articles, the weighing value being output at a discharge timing at which the combination weighing apparatus discharged the articles to the packaging apparatus and the identification information being output at a packaging timing at which the articles corresponding to the weighing value were packaged by the packaging apparatus, and the management device stores the production information in the storage device,
wherein the identification information includes a unique identification number for each package that is packaged by the packaging apparatus,
wherein the combination weighing apparatus outputs a calculation number generated every time the combination calculation is performed, to the packaging apparatus at the discharge timing, and outputs weighing information associating the weighing value with the calculation number to the management device,
the packaging apparatus receives the calculation number output from the combination weighing apparatus and outputs packaging information associating the received calculation number with the identification information output to the management device at the packaging timing,
the management device generates the production information based on the weighing information received from the combination weighing apparatus and the packaging information received from the packaging apparatus, the weighing information associating the weighing value and information for identifying a number of heads of weighing hoppers used in the combination calculation, information for identifying the weighing hoppers used in the combination weighing with the calculation number associated with the combination calculation and the packaging information associating the calculation number with the identification information output at the packaging timing.

5. The production management system according to claim 4,
wherein the packaging information includes information about the packaging apparatus when the articles were packaged as information to be associated with the calculation number in addition to the identification information.

6. The production management system according to claim 4,
wherein a first timing for sending the weighing information to the management device and a second timing for sending the calculation number to the packaging apparatus, wherein the first timing and the second timing differ from each other in the combination weighing apparatus.

7. The production management system according to claim 5,
wherein a first timing for sending the weighing information to the management device and a second timing for sending the calculation number to the packaging apparatus, wherein the first timing and the second timing differ from each other in the combination weighing apparatus.

8. The production management system according to claim 4, wherein the information about the combination weighing apparatus includes the identification of the number of weighing hoppers used in the combination calculation and the identification of which weighing hoppers were used in the combination calculation.

* * * * *